United States Patent [19]
Koriakov-Savoysky et al.

[11] Patent Number: 5,505,668
[45] Date of Patent: Apr. 9, 1996

[54] GEAR SYSTEM

[75] Inventors: Boris A. Koriakov-Savoysky; Igor V. Aleksahin; Ivan P. Vlasov, all of Dnepropetrovsk, Ukraine

[73] Assignee: Ikona Gears Limited, Nicosia, Cyprus

[21] Appl. No.: 284,847

[22] Filed: Aug. 2, 1994

[51] Int. Cl.⁶ ........................................ F16H 1/32
[52] U.S. Cl. ........................ 475/180; 475/344; 74/462
[58] Field of Search .................... 475/180, 344; 74/462

[56] References Cited

U.S. PATENT DOCUMENTS

| | | | |
|---|---|---|---|
| 3,546,972 | 12/1970 | Morozumi | 475/180 |
| 4,270,401 | 6/1981 | Davidson | 475/344 |
| 4,452,102 | 6/1984 | Shaffer | 475/180 |
| 5,232,412 | 8/1993 | Zheng et al. | 74/462 |

*Primary Examiner*—Dirk Wright
*Attorney, Agent, or Firm*—Burd, Bartz & Gutenkauf

[57] ABSTRACT

In a conventional internal gear pair system such as a planetary gear system with a small gear ratio of the internal gear to the driving pinion, common problems include tip interference and limited contact between the teeth of the gears. An internal gear pair system which avoids these problems includes a pinion meshing with an internal gear, the pinion having as few as one tooth less than the internal gear, the only contact between the pinion and the internal gear being on at least one side of a line extending diametrically through the centers of the pinion and the internal gear, and the teeth of the pinion being conjugate to the internal gear teeth.

3 Claims, 4 Drawing Sheets

GEAR SYSTEM

BACKGROUND OF THE INVENTION

1. Field of the Invention

This invention relates to a gear system. More specifically, the invention relates to an internal gear pair system, e.g. in a planetary gear system.

2. Discussion of the Prior Art

Planetary or epicyclic gear systems for use in speed reducers are by no means new. Examples of such systems are described in U.S. Pat. Nos. 546,249, issued to D. S. Regan on Sep. 10, 1895; 1,693,154, issued to J. Newmann on Nov. 27, 1928; 2,037,787, issued to J. W. Hughes on Apr. 21, 1936; 2,049,696, issued to E. A. M. Fliesberg on Aug. 4, 1936; 2,250,259, issued to B. Foote, Jr. on Jul. 22, 1941 and 5,277,672, issued to Droulon et al on Jan. 11, 1994.

One application of an internal gear pair system is in a planetary gear system. The basic elements of a planetary gear system include an internal gear, which is an annular gear, and a pinion, which is a gear with a smaller number of teeth than the internal gear. When the pinion is driven, the teeth thereof mesh with the teeth of the internal gear for driving the latter. When producing internal gear pair systems two of the main problems to be considered are (i) interference between the tips of the gear teeth and (ii) good contact between the gear teeth to ensure maximum torque transmission. It is also sometimes desirable to be able to make the tooth ratio as close as possible to one. To do so the difference in the number of teeth on the pinion and the internal gear must be a minimum. Ideally, it should be possible to reduce the difference between the number of teeth on the internal gear and the pinion to one. Common problems in such gear pair systems are tip interference and limited contact between the teeth of the gears.

GENERAL DESCRIPTION OF THE INVENTION

An object of the present invention is to provide solutions to the above identified problems in the form of an internal gear pair system, in which there is no tip interference even when the difference in the number of teeth between the internal gear and the pinion is as low as one.

Another object of the invention is to provide an internal gear pair system in which the teeth of the pinion are conjugate with those of the internal gear, and in which there is a high contact ratio, so that the rotational force is shared between a plurality of tooth pairs.

Yet another object of the invention is to provide an internal gear pair system in which the possibility of backlash between the pinion and the internal gear is reduced to a minimum or eliminated.

Accordingly, the invention relates to an internal gear pair system comprising pinion means; first teeth means on said pinion means; internal gear means; second teeth means on said internal gear means meshing with said pinion means for rotation of said internal gear means by said pinion means; said internal gear means having at least one tooth means more than said pinion means, the only contact between said first and second tooth means being on at least one side of a line extending diametrically through the centers of said pinion means and said internal gear means, and said first teeth means being conjugate to said second teeth means.

A specific version of the gear pair system is a planetary gear system including the elements described above.

BRIEF DESCRIPTION OF THE DRAWINGS

The invention is described hereinafter with reference to the accompanying drawings, which illustrate a preferred embodiment of the invention, and wherein.

DESCRIPTION OF PREFERRED EMBODIMENT

Figure 1:
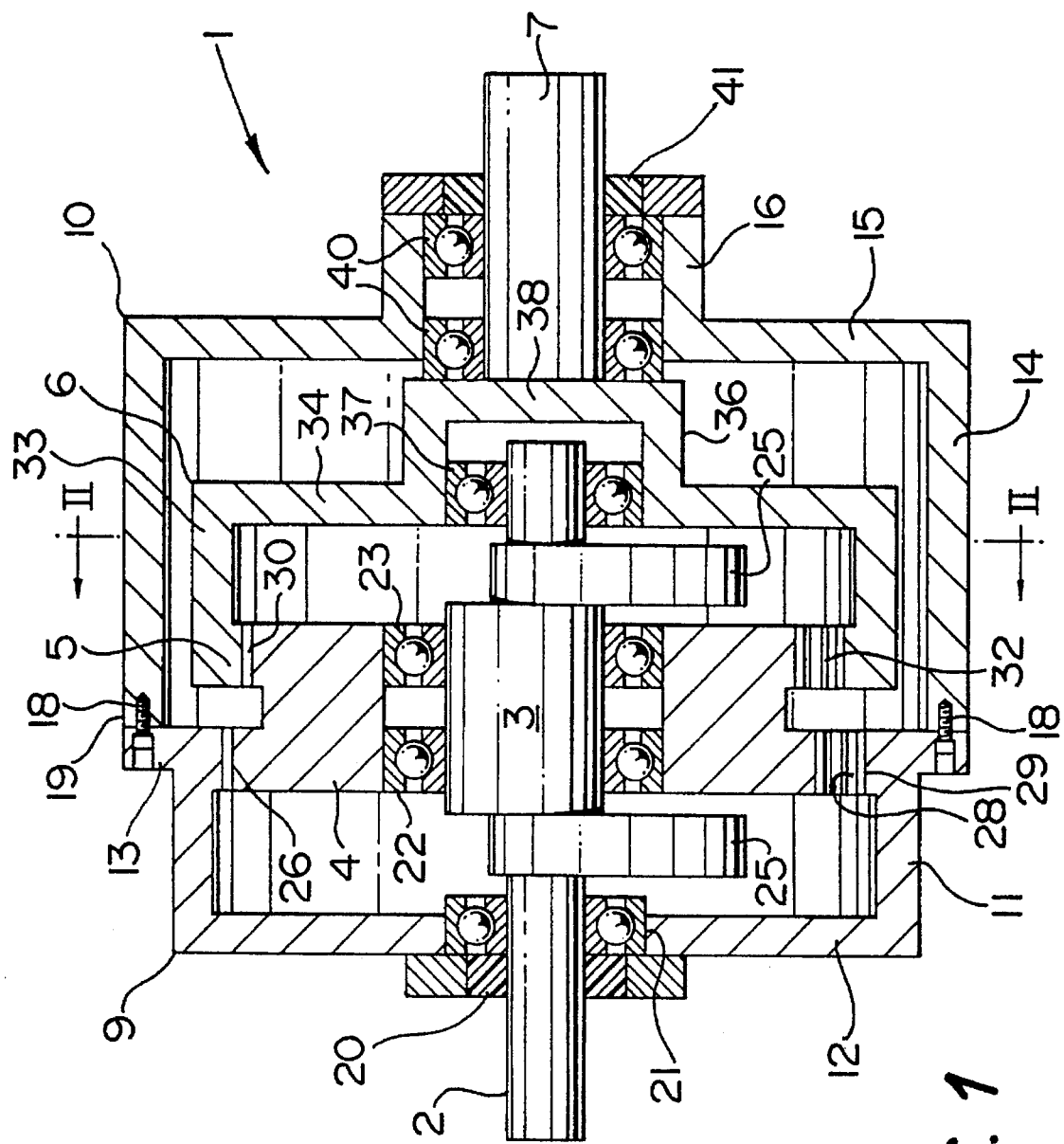
FIG. 1 is a schematic longitudinal sectional view of a planetary gear system in accordance with the present invention.
Figure 2:
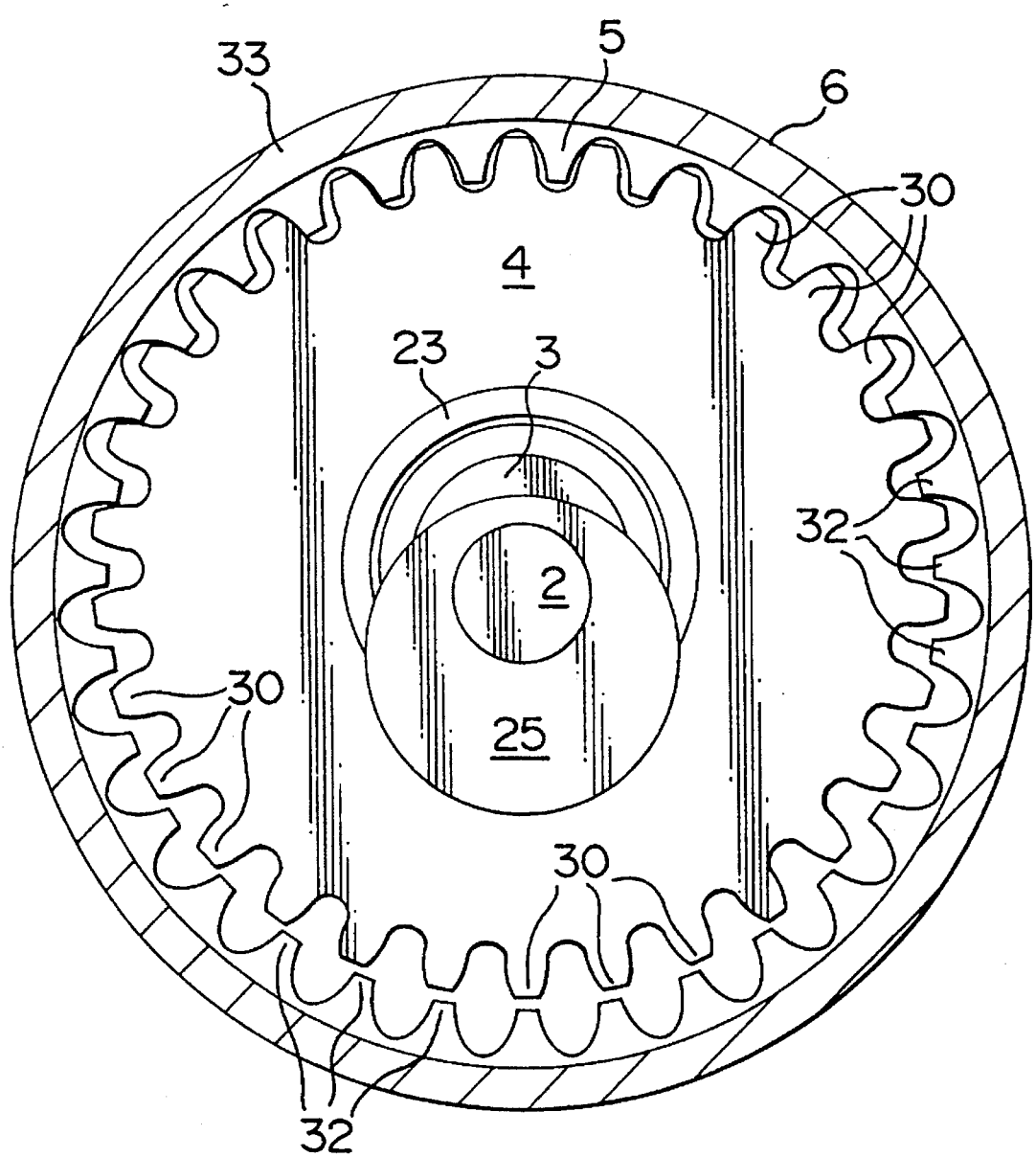
FIG. 2 is a cross section taken generally along line II—II of FIG. 1, with parts omitted.

With reference to FIGS. 1 and 2, the basic elements of a planetary gear system in accordance with the present invention include a casing generally indicated at 1 which houses an input or drive shaft 2 with an eccentric 3 thereon, a planet 4 for driving an internal gear 5 on a wheel 6, and an output or driven shaft 7 connected to the gear 5 by the wheel 6.

The casing 1 is defined by a pair of cylindrical sections 9 and 10. The casing section 9 includes a cylindrical side wall 11, an outer end wall 12 and an annular flange 13 on the open inner end thereof. The casing section 10 includes a cylindrical side wall 14, an end wall 15 and a sleeve 16 extending outwardly from the end wall 15. The sections 9 and 10 are interconnected by a plurality of screws 18 (two shown) extending through the annular flange 13 into the open end 19 of the casing section 10.

The input shaft 2 extends through an oil seal 20 on the end wall 12 of the casing section 9 and a ball bearing 21 in such end wall. The eccentric 3 on the input shaft 2 carries the planet 4, which is separated from the eccentric by bearings 22 and 23 in the housing 1. Counterweights 25 are provided on the shaft at each end of the eccentric 3.

The planet 4 includes a first pinion with teeth 26 at the input end thereof for engaging an annular row of teeth 28 on a flange 29 extending radially inwardly of the open inner end of the casing section 9. Teeth 30 on the output end of the planet 4 engage teeth 32 on the internal gear 5.

The internal gear 5 is defined by a radially inwardly extending flange on the open end of the wheel 6. As best shown in FIG. 1, the wheel 6 includes a side wall 33 integral with the internal gear 5 and an end wall 34. A cup 36 extends outwardly from the end wall 34 for receiving a bearing 37, which supports the inner end of the input shaft 2.

The output shaft 7 is mounted on the center of the outer end wall 38 of the cup 36. The shaft 7 extends outwardly through bearings 40 mounted in the sleeve 16 of the casing section 10, and an annular oil seal 41.

Figure 3:
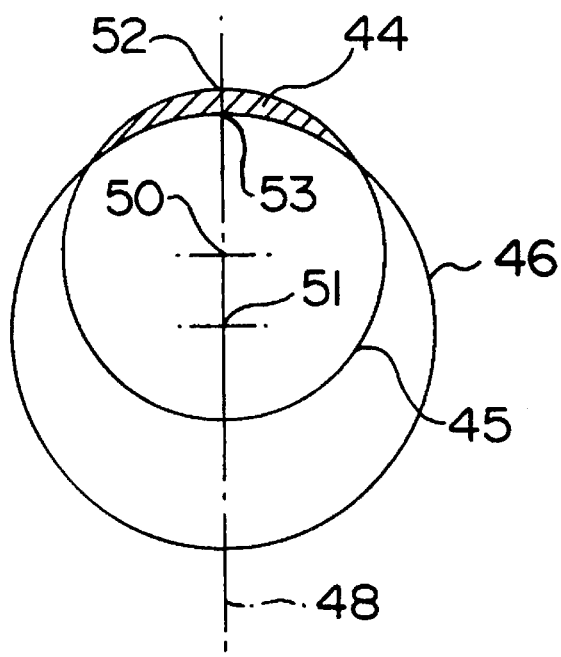
FIG. 3 is a schematic front view of the tip circles for the pinion and internal gear of an internal gear system.

In operation, rotation of the input shaft 2 results in epicyclic movement of the planet 4 in the internal gear 5. Thus, the gear 5 and consequently the output shaft 7 are driven at a reduced speed which is dependent upon the tooth numbers of the two internal gear pairs. FIG. 3 shows the tip circles of an internal gear pair such as the pinion and internal gear the teeth of which are numbered 26 and 28 in FIG. 1, or the pinion and internal gear the teeth of which are numbered 30 and 32. As shown in FIG. 3 the area 44 of overlap between tip circle 45 of the teeth of the pinion and the tip circle 46 of the internal gear is crescent-shaped. The area 44 is the only area of overlap, and consequently tooth contact must occur in such area. A line 48 passing through the gear centers 50 and 51 (of the pinion and the internal gear, respectively) intersects the tip circles 45 and 46 at points 52 and 53, respectively. The working depth of the teeth is the distance between the points 52 and 53, respectively.

Figure 4:
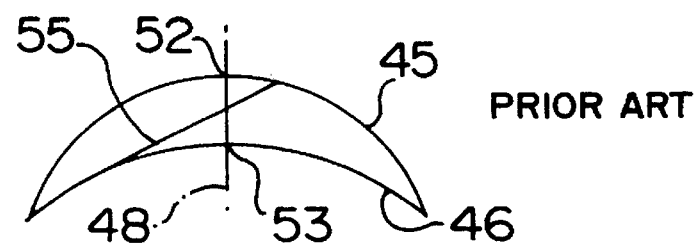
FIGS. 4 to 6 are schematic front views of the areas of overlap of the tip circles showing the lines of teeth contact for conventional involute teeth.
Figure 5:
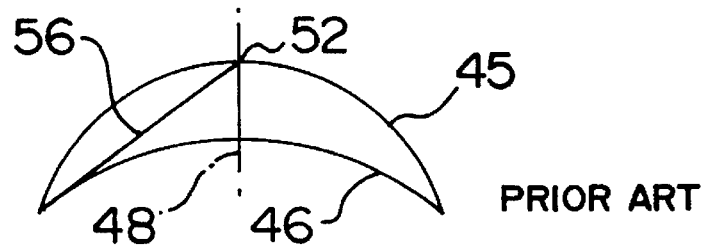
Figure 6:
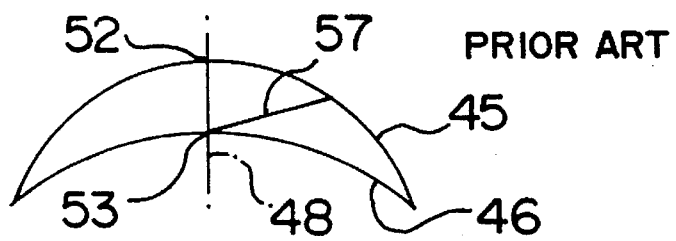

In any internal gear pair system, the pitch point is the point on the line of centers such that the distances to the gear centers are in the same ratio as the tooth numbers. If the path of contact intersects the line of centers, it must do so at the pitch point. In a conventional gear pair, the pitch point lies between the tip circles, namely between points 52 and 53 in FIG. 4. In a conventional involute gear pair system, the path of contact 55 (FIG. 4) between the pinion and the internal gear is a straight line, through the pitch point, which most commonly lies between the points 52 and 53. With clockwise rotation and the pinion driving, the contact starts at the left end of the contact path 55 where the path intersects the tip circle 46 of the internal gear. Contact ends at the point where the contact path 55 intersects the tip circle 45 of the pinion. The arrangement shown in FIG. 4 is the most common, with the pitch point between the points 52 and 53. when the pitch point coincides with point 52 (FIG. 5), there is an all approach action, and when the pitch point coincides with the point 53 (FIG. 6) there is an all recess action. If the driving pinion is rotated counterclockwise, the contact paths are the mirror images of the one shown in FIGS. 4 to 6.

When the teeth number difference ($N_2-N_1$) for an involute internal gear/pinion pair (where $N_2$ is the number of internal gear teeth and $N_1$ is the number of pinion teeth) is less than approximately six, tip interference or fouling commonly occurs. The tooth tips of the pinion run into those of the internal gear at a point remote from the line of centers 48. A gear pair with such interference is unusable.

Figure 7:
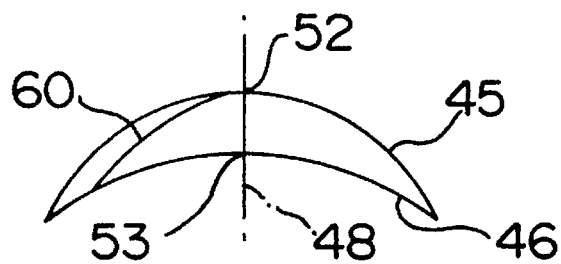
FIGS. 7 and 8 are schematic front views of the areas of overlap of the tip circles showing the lines of teeth contact for the internal gear pairs used in the planetary gear system of FIGS. 1 and 2.
Figure 8:
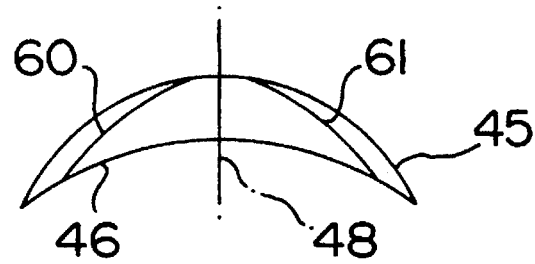

As best illustrated in FIG. 7, in the present case a conjugate tooth form is used, with the pitch point always lying on the line 48 outside of the area between the points 52 and 53. It will be noted that if the contact line 60 for clockwise rotation is extended, it intersects the center line 48 above the overlap area of the tip circles 45 and 46. The same is true for rotation in the opposite direction (FIG. 8), an extension of the contact line 61 intersecting the center line 48 above the overlap area of the tip circles 45 and 46. The pitch point lies on the center line 48 above point 52 and the pitch circle radius $R_{p1}$ of the pinion is larger than the tip circle radius $R_{T1}$ of the pinion. If the ratio ($R_{p1}/R_{T1}$) is chosen correctly, it is possible to prevent tip interference even when the teeth number difference ($N_2-N_1$) is as small as 1.

Figure 9:
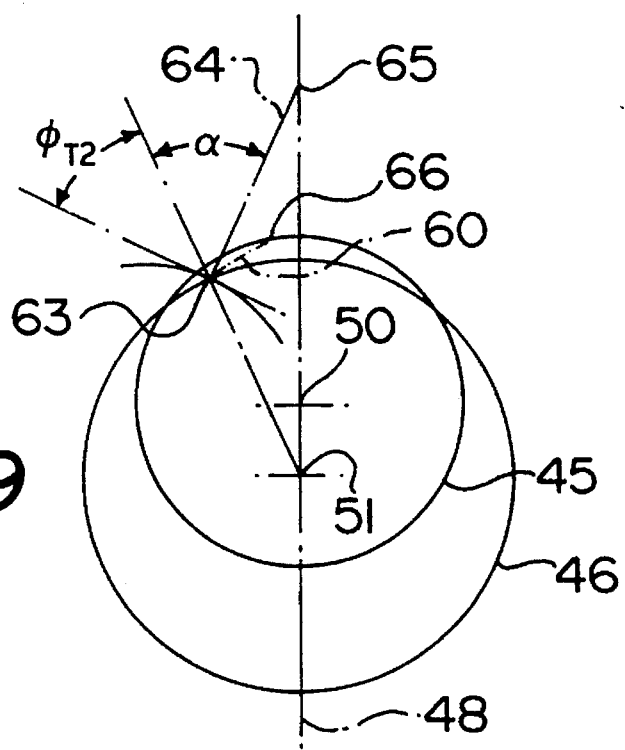
FIG. 9 is a schematic front view of the tip circles for the internal gear pairs of the present invention showing a tooth profile of the internal gear.

Since the pitch point does not lie in the crescent-shaped area 44 (FIG. 3) where tooth contact occurs, it is impossible for the path of contact (line 60 or 61) to pass through the pitch point. As shown in FIG. 9, for the path of contact, the inventors have chosen a curve 60 starting at a point 63 on the tip circle 46 of the internal gear and ending at point 66 on the tip circle 45 of the pinion. A curve for the path of contact is chosen with a radius of curvature approximately equal to the mean value of the tip circle radii 0.5 ($R_{T1}+R_2$) so that the curve lies entirely within the contact crescent. The contact ratio of the gear teeth depends essentially on the length of the path of contact. Accordingly, by making the contact curve as long as possible, a high contact ratio is achieved.

As mentioned above, when the pinion turns counterclockwise, the contact path 61 (FIG. 8) is the mirror image of the contact path 60 for clockwise rotation. As best shown in FIG. 2, the tooth profiles are such that during clockwise rotation of the gears with the pinion driving, the righthand tooth faces of the pinion make contact along the line or curve 60, and the lefthand tooth faces make contact along the line or curve 61. Since the contacts occur simultaneously, there is no backlash. An important feature of the invention is that there is no contact as the teeth pass through the line of centers 48.

When the ratio $R_{p1}/R_{T1}$ is sufficiently large it has been found that there is no tip interference. However, as the ratio increases, it is found that the tooth thickness decreases. The optimum value of the ratio is therefore the smallest value at which there is no tip interference. The following values have been found to work well.
When

| | |
|---|---|
| $N_2-N_1 > 7$ | $R_{p1}/R_{T1} = 1.03$ |
| $N_2-N_1 = 7$ | $R_{p1}/R_{T1} = 1.05$ |
| $N_2-N_1 = 6$ | $R_{p1}/R_{T1} = 1.07$ |
| $N_2-N_1 = 5$ | $R_{p1}/R_{T1} = 1.10$ |
| $N_2-N_1 = 4$ | $R_{p1}/R_{T1} = 1.15$ |
| $N_2-N_1 = 3$ | $R_{p1}/R_{T1} = 1.25$ |
| $N_2-N_1 = 2$ | $R_{p1}/R_{T1} = 1.40$ |

All of the above listed values were chosen primarily to avoid tip interference. For values of $N_2-N_1$ of six or greater, tip interference is generally not a problem, but the use of a ratio $R_{p1}/R_{T1}$ greater than 1 allows a longer contact path than when the pitch point lies between points 52 and 53, and therefore a higher contact ratio.

When $N_2-N_1=1$, the ratio $R_{p1}/R_{T1}$ is chosen to achieve two objectives, namely (i) no tip interference, and (ii) sufficient clearance (cl) between the tooth tips at the opposite end of the line of centers (i.e. the distance between the bottom of the tip circles 45 and 46 in FIG. 3). In order to satisfy the clearance requirement, the pitch circle radius of the pinion should be chosen using the equation:

$$R_{p1}=N_1(W_D+cl)/2$$

Wherein $W_D$ is the working depth of the teeth 44 (the distance between points 52 and 53) and cl is the clearance mentioned above. However, for larger values of $N_1$ (typically greater than 200), it may be necessary to increase the value of $R_{p1}$ above this value in order to prevent tip interference. The value should then be calculated by the expression:

$$R_{p1}/R_{T1}=1.75+(N_1/1000)$$

It is preferable to calculate both values and then use the larger value. Once $R_{p1}$ has been determined, the value of the distance C between the centers 50 and 51 can be determined from the equation:

$$C=R_{p1}(N_2-N_1)/N_1$$

Referring to FIG. 9, initial contact between the gear teeth occurs at point 63, with the common normal 64 at the contact point passing through the pitch point 65. The angle α between the radius of the internal gear (the line between the points 51 and 63 in FIG. 9) and the line 64 being equal to $90-\phi_{T2}$ degrees, where $\phi_{T2}$ is the profile angle (or pressure angle) of the internal gear tooth at its tip. The point 63 is chosen so that $\phi_{T2}$ has a suitable value, typically between 2 and 16 degrees, preferably 8 degrees which has been found to work very well.

Similarly, when contact ends at point 66, the angle between the radius of the pinion (the line between the points 50 and 66) and a line (not shown) between the points 66 and 65 is equal to $90-\phi T_1$ degrees, where $\phi_{T1}$ is the pinion tooth profile angle at its tip. The point 66 is chosen to give a suitable value for $\phi_{T1}$, typically between 30° and 40°, and preferably 35° which has been found to work well.

The contact curve between the points 63 and 66 can be any smooth curve in which the distance to the point 50 (the center of the pinion) increases monotonically as contact moves from 63 to 66. A suitable curve for this purpose is an Archimedean spiral, the equation for which is $R_1 = R_{10} + k\theta$, where $R_{10}$ and $k$ are constants and $\theta$ is the polar angle. Once the path of contact has been chosen, the conjugate tooth profiles of the pinion and the internal gear can be calculated by the methods of conventional gear geometry.

The tooth form described above can be used in any gear train in which there are internal gear pairs, and in particular in planetary gear systems. The advantages of the tooth form are most significant when the number of teeth is large, and when $N_2-N_1$ is small. In the gear train illustrated in FIGS. 1 and 2, the lefthand pinion of the planet 4 meshes with a fixed internal gear in the casing, while the righthand pinion meshes with a rotating internal gear 5 which is connected to the output shaft 7. In the gear train shown, the center distance (the distance between the gear centers) is small, so that the planet carrier would generally be replaced by an eccentric. The reduction ratio for the gear train is $N_1 N_4/(N_1 N_4 - N_2 N_3)$, where $N_1$ to $N_4$ are the numbers of teeth on the lefthand pinion of the planet 4, the fixed internal gear, the righthand pinion of the planet 4 and the rotatable internal gear 5, respectively. The tooth number differences $N_2-N_1$ and $N_4-N_3$ can be as small as 1 which allows a very wide range of reduction ratios. Values of $N_1$ to $N_4$ can be found for any reduction ratio between 9 and 5000 with an error of less than 0.1%. If the output shaft is required to turn in the opposite direction from the input shaft, the tooth numbers can be chosen to give any ratio between −9 and −5000, again with an error of less than 0.1%.

Other considerations for calculating gear parameters for the gear system of the present invention include calculations of the module ($m_t$) and the pinion tip circle radius ($R_{T1}$).

Module and Pinion Tip Circle Radius:
if the module $m_t$ is chosen, then the pinion tip circle radius is given by $$m_t = R_{T1}/(0.5N_1 + 1)$$

This relation between the module and the tip circle radius is typical for standard external gears. The choice of a value for either parameter effectively determines the size of the gears.

The equation for the pinion pitch circle radius $R_{p1}$ is given above. The center distance C (the distance between the pinion and internal gear centers 50 and 51, respectively) is given by $$C = R_{p1}(N_2 - N_1)/N_1$$

where $N_2$ is the number of teeth in the internal gear, and $N_1$ is the number of teeth on the pinion.

A value for the working depth (WD) is chosen. Values of approximately $1.5 \, m_t$ to $2.0 \, m_t$ are typical for conventional involute internal gear pairs and for the present invention the value of $1.6 \, m_t$ has been found to work well. The tip circle radius $R_{T2}$ of the internal gear is then given by $$R_{T2} = C + R_{T1} - WD$$

Clearance:
the clearance (cl), which is the clearance between the gear tooth tips on the line of centers at the end of the line opposite the pitch point, is always adequate when $N_2-N_1$ is greater than 1. When $N_2-N_1=1$, the value for $R_{p1}$ must be chosen to give sufficient clearance. For minimum clearance, the value $0.4 \, m_t$ is chosen.

Tooth Depths:
the tooth depths of the gears are chosen to give a root clearance of $0.35 \, m_t$. The root clearance is the distance between the root circle of one gear and the tip circle of the other measured at the pitch point end of the line of centers. In order to obtain a clearance of $0.35 \, m_t$, the root circle radii $R_{root1}$ and $R_{root2}$ are as follows:

$$R_{root1} = R_{T2} - C - 0.35 \, m_t$$

$$R_{root2} = R_{T1} + C + 0.35 \, m_t$$

Tooth Thickness:
the tooth thickness of one gear can be chosen arbitrarily, and the tooth thickness of the other gear is then found from the condition that there is no backlash.

If $R_1$ is the pinion radius four tenths of the distance up the active profile of the pinion, measured from the lowest point at which there is contact, $R_1$ is given by the expression $$R_1 = 0.6 \, R_{L1} + 0.4 \, T_{T1}$$

where $R_{L1}$ is the radius at the lowest point at which contact takes place, and $R_{T1}$ is the tip circle radius. The tooth thicknesses are chosen so that the pinion tooth thickness at radius $R_1$ is equal to the internal gear tooth thickness at the radius $R_2$ (the radius on the internal gear at the point which contacts the pinion at radius $R_1$). The factor 4/10 was chosen to give teeth in which the tooth strengths of the pinion and of the internal gear appear to be almost equal.

The contact ratios for internal gear pairs with the gear tooth forms described above are as follows:

| | (N2–N1) | | | | | |
|---|---|---|---|---|---|---|
| | 1 | 2 | 3 | 4 | 5 | 6 |
| N1 | | | CONTACT RATIO | | | |
| 40 | 2.55 | 2.37 | 2.27 | 2.14 | 2.05 | 1.98 |
| 60 | 3.55 | 3.19 | 2.98 | 2.73 | 2.55 | 2.41 |
| 80 | 4.54 | 4.00 | 3.68 | 3.31 | 3.04 | 2.82 |
| 100 | 5.54 | 4.81 | 4.38 | 3.89 | 3.52 | 3.22 |
| 150 | 8.03 | 6.83 | 6.11 | 5.31 | 4.70 | 4.20 |
| 200 | 10.51 | 8.85 | 7.85 | 6.72 | 5.87 | 5.17 |
| 250 | 13.03 | 10.86 | 9.58 | 8.14 | 7.03 | 6.13 |
| 300 | 15.65 | 12.87 | 11.31 | 9.55 | 8.20 | 7.09 |

In the foregoing, $N_1$ is the number of teeth on the pinion, $N_2$ is the number of teeth in the internal gear, and $N_2-N_1$ is the tooth number difference.

We claim:

1. An internal gear pair system comprising pinion means; first teeth means on said pinion means; internal gear means; second teeth means on said internal gear means for meshing with said first teeth means for rotation of said internal gear means by said pinion means; said internal gear means having at least one tooth means more than said pinion means, said first teeth means being conjugate to said second teeth means, the contact between said first and second teeth means occurring in a crescent-shaped area defined by the area of overlap of tip circles for the first and second teeth means, the contact path between said first and second teeth means being curved and lying within the crescent-shaped area, and the only contact between said first and second teeth means being entirely on one side of a line extending diametrically through the centers of said pinion means and said internal gear means.

2. A gear pair system according to claim 1 wherein said pinion means and internal gear means are part of a planetary gear system.

3. A planetary gear system comprising casing means, input shaft means rotatable in said casing means; eccentric means on said input shaft means; pinion means on said eccentric means for rotation therewith; first teeth means on said pinion means; internal gear means; second teeth means on said internal gear means meshing with said first teeth means for rotation of said internal gear means by said pinion means; and output shaft means connected to said internal gear means for rotation therewith, said internal gear means having at least one tooth more than said pinion means for effecting a reduction in rotational speed of said output shaft means relative to said input shaft means, said first teeth means being conjugate to said second teeth means, the contact between said first and second teeth means occurring in a crescent-shaped area defined by the area of overlap of tip circles for the first and second teeth means, the contact path between said first and second teeth means being curved and lying within the crescent-shaped area, and the only contact between said first and second teeth means being entirely on one side of a line extending diametrically through the centers of said pinion means and said internal gear means.

* * * * *